(12) United States Patent
Maier et al.

(10) Patent No.: US 7,497,139 B2
(45) Date of Patent: Mar. 3, 2009

(54) SUSPENSION COMPONENT FOR A GYROSCOPE IN HIGH SHOCK ENVIRONMENTS

(75) Inventors: Eric Maier, Salt Lake City, UT (US); Rick Anderson, Draper, UT (US); Doug Olsen, Salt Lake City, UT (US); Sams Engelman, Salt Lake City, UT (US); Roger Burlingame, Thousand Oaks, CA (US); Larry Dean Krieger, Salt Lake City, UT (US)

(73) Assignee: Northrop Grumman Corporation, Los Angeles, CA (US)

( * ) Notice: Subject to any disclaimer, the term of this patent is extended or adjusted under 35 U.S.C. 154(b) by 419 days.

(21) Appl. No.: 11/289,929

(22) Filed: Nov. 30, 2005

(65) Prior Publication Data

US 2007/0119250 A1    May 31, 2007

(51) Int. Cl.
G01C 19/04  (2006.01)
G01C 19/06  (2006.01)
(52) U.S. Cl. .......................................... 74/5.7; 74/5 F
(58) Field of Classification Search ............... 74/5.7, 74/5 F
See application file for complete search history.

(56) References Cited

U.S. PATENT DOCUMENTS 3,512,419 A    5/1970  Stiles
3,843,108 A    10/1974 Krupick et al.
4,082,005 A *  4/1978  Erdley ........................... 74/5 F
4,825,713 A    5/1989  Wilkey
6,309,283 B1 * 10/2001 Liners et al. ................... 451/41
6,539,801 B1 *  4/2003 Gutierrez et al. ......... 73/504.12
6,575,032 B2 *  6/2003 Anderson et al. ............. 73/510
6,601,450 B2 *  8/2003 Burlingame ............. 73/504.08
7,401,397 B2 *  7/2008 Shcheglov et al. ............ 29/595
2002/0040950 A1  4/2002 Staley et al.

FOREIGN PATENT DOCUMENTS

GB    1 378 946 A    1/1975

OTHER PUBLICATIONS

Mansour, William M. et al; Two-Axis Dry Tuned-Rotor Gyroscopes: Design and Technology; Journal of Guidance, Control and Dynamics; May 1, 1993; pp. 417-425; vol. 16, No. 3; American Institute of Aeronautics and Astronautics, Inc.; Reston, VA, USA.

* cited by examiner

Primary Examiner—Tisha D Lewis
(74) Attorney, Agent, or Firm—Patti, Hewitt & Arezina LLC (57) ABSTRACT

An apparatus in one example has: a first component coupled to a second component by a suspension component; and the suspension component structured to maintain predetermined angular spring rates and to maintain high linear spring rates, that are higher than the angular spring rates, along linear axes of the suspension component that flex under predetermined increased dynamic loading of the suspension component.

21 Claims, 7 Drawing Sheets

SUSPENSION COMPONENT FOR A GYROSCOPE IN HIGH SHOCK ENVIRONMENTS

TECHNICAL FIELD

The invention relates generally to mechanical gyroscopes, and more particularly to mechanical gyroscopes that utilize one or two degree of freedom flexure components between a spinning gyroscopic mass and a spinning shaft in gyroscope design for high acceleration and shock environments.

BACKGROUND

As is known in the art, rate gyroscopes have been used in a variety of applications, such as in systems for stabilization of a seeker tracking system, stabilization of various platforms, and vehicle flight control.

One type of rate gyroscope utilizes a single degree of freedom flexure component between a spinning mass and a spinning shaft. In response to an angular rate about a an axis perpendicular to the spin axis, the mass pivots about an axis of a precession. The axis of precession, the angular rate input axis and the spin axis are mutually orthogonal. It follows then that, if the flexure element that connects the rotating mass to the gyroscope shaft is a single degree of freedom flexure then the rotating mass will oscillate about its single degree of freedom if the case is subjected to an angular rate. This oscillation is a function of angular rate input.

A second type of rate gyroscope is a two degree of freedom rate gyroscope. In such a gyroscope a two degree of freedom flexure component is utilized between the spinning mass and the spinning shaft. In response to an angular rate about an axis perpendicular to the spin axis, the mass pivots about an axis of a precession. The axis of precession, the angular rate input axis and the spin axis are mutually orthogonal. It follows then that, if the flexure element that connects the rotating mass to the gyroscope shaft has two degrees of freedom then the rotating mass precesses and forms an angle between the rotating mass and the gyroscope case if the case is subjected to an angular rate. This angle is a function of the angular rate input.

Current state-of-the-art devices within the two degree of freedom gyroscope class utilize a spinning mass that is supported by a tuned flexure which decouples the rotating mass from the rotating shaft and gyroscope case. When the gyroscope case is subjected to angular inputs, the gyroscope case moves relative to the spinning mass. A position transducer determines the change in position of the case relative to the spinning mass. The position transducer and associated electronics produces an electrical signal that is fed to a torque coil, which is mounted on the gyroscope case. A magnet assembly located in the spinning mass produces a magnetic field that interacts with the current flowing in the torque coil. This interaction produces a force that restores the spinning mass to a null position. The torque coil current provides a measurement of the input angular rate to the gyroscope case.

The primary disadvantage of the current-state-of-the-art of one and two degree of freedom flexures under high dynamic load conditions is the typical use of stiff suspension beams in three of the orthogonal linear axes and two (in the case of a single degree of freedom flexure) or one (in the case of a two degree of freedom flexure) of the three angular orthogonal axes, which when subjected to high shock or acceleration, buckle under the increased load. In the case of the single degree of freedom rate gyroscope there is typically one angular axis that is a relatively weak angular spring and in the case of the two degree of freedom gyroscope there are typically two angular axes that are relatively weak.

SUMMARY

One implementation encompasses an apparatus. The apparatus may comprise: a first component coupled to a second component by a suspension component; and the suspension component structured to maintain predetermined angular spring rates and to maintain higher spring rates, than the angular spring rates, along linear axes of the suspension component that flex under predetermined increased dynamic loading of the suspension component. This general implementation utilizes mechanical stops in all three linear axes that are either part of the suspension component or are formed by other elements in the gyroscope. The stops are structured to ensure that the suspension elements do not exceed their yield strength under dynamic loading.

DESCRIPTION OF THE DRAWINGS

Features of exemplary implementations of the invention will become apparent from the description, the claims, and the accompanying drawings in which:

DETAILED DESCRIPTION

A two degree of freedom dry tuned gyroscope according to the present method and apparatus utilizes a spinning mass, electromagnetic pick-offs for sensing the motion of the gyroscope case relative to the spinning mass, and forcing coils with associated magnets to maintain the spinning mass in a fixed orientation relative to the gyroscope case to provide closed loop operation. This gyroscope utilizes a suspension design that incorporates a combination of integral load absorbing spring elements and hard mechanical stops. The suspension design provides high acceleration and shock protection without compromising gyro performance or manufacturing cost.

Figure 1A:
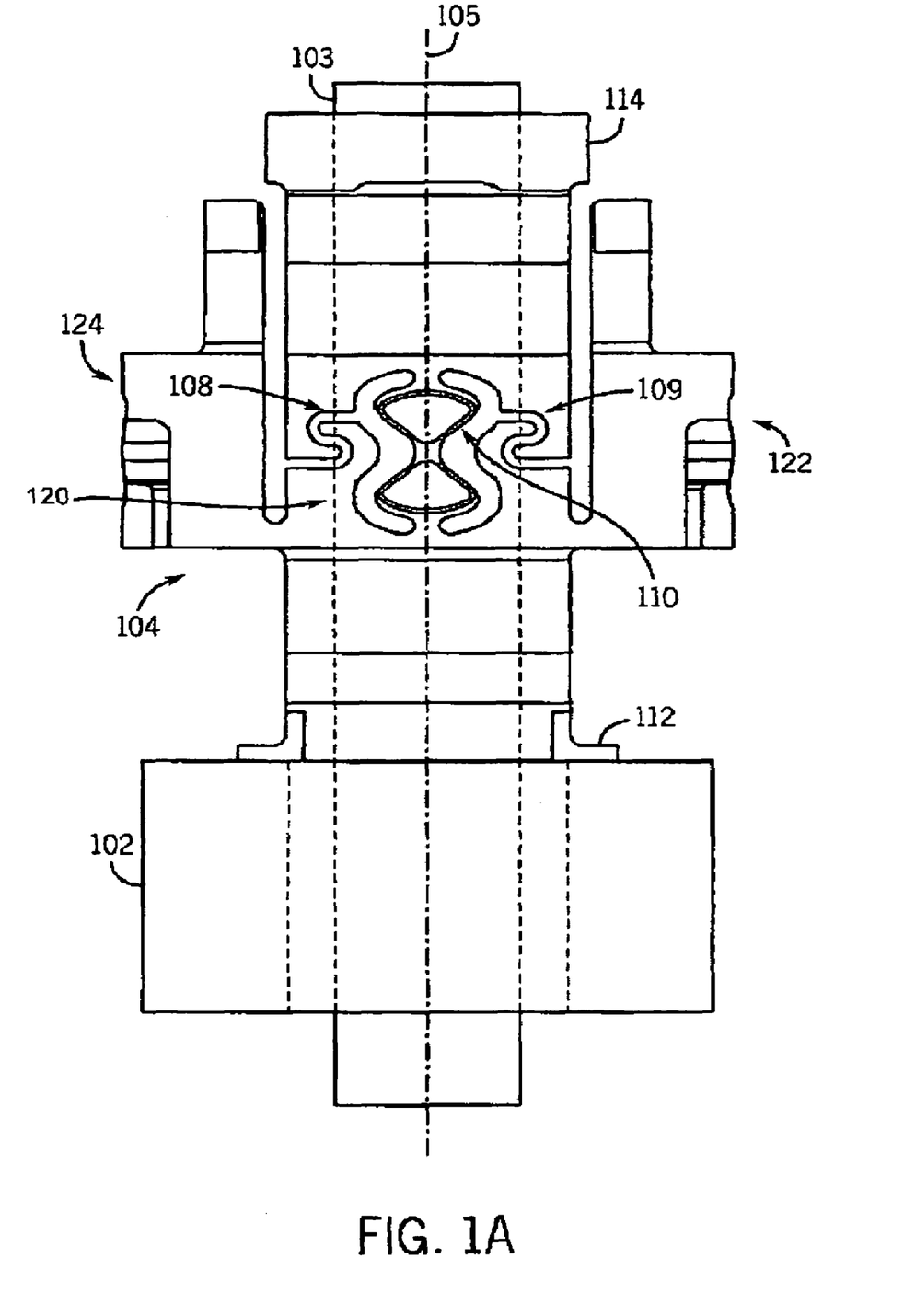
FIG. 1A shows a side view of one embodiment of a suspension component for a gyroscope according to the present method and apparatus.

FIG. 1 shows a side view of one embodiment of a suspension component 104 for a gyroscope according to the present method and apparatus. In this embodiment the suspension component 104 may couple a rotating shaft 103 to a spinning mass 102. such as a rotor, to form a rate gyroscope. The spinning mass 102 may be attached to a rotor attach portion 112 on the suspension component 104, and the shaft 103 may be coupled to a shaft attach portion 114 on the suspension component 104. The spinning mass 102 may have a longitudinal spin axis 105, and the shaft 103, which rotates the spinning mass 102, may be aligned to the longitudinal spin axis 105. The suspension component 104 may have at least two pairs of suspension structures 106, 120 (opposed from 106) and 122, 124 that are orthogonal to each other (also see FIGS. 2A, 2B and 2C). Each of the suspension structures 106, 120, 122 and 124 may have at least one meandering mechanical stop. In the depicted embodiment the suspension structure 106, for example, may have first and second mirror image opposed meandering mechanical stops 108, 109, and a substantially figure eight configured spring arm portion 110. Spring arm portions may also be referred to as flexures.

The first and second mirror image opposed meandering mechanical stops 108, 109 of each of the suspension structures 106, 120, 122 and 124 limit movement of the shaft 103 and spinning mass 102 relative to one another due to linear forces, such as high shocks and accelerations, on the gyroscope while allowing movement of the shaft 103 and spinning mass 102 relative to one another due to angular forces on the gyroscope.

In an embodiment the first and second mirror image opposed meandering mechanical stops 108, 109 limit movement of the shaft 103 and spinning mass 102 relative to one another to approximately 0.003 inches. The first and second mirror image opposed meandering mechanical stops 108, 109 may have a gap of approximately 0.003 inch. More generally, the gap may be in the range of 0.002 to 0.005 inch.

Although the shaft 103 and the spinning mass 102 are attached to opposed ends of the suspension component 104, the spinning mass 102 typically surrounds the suspension component so that the rotor center of mass is coincident to the suspension structure's rotational axis. Also, the spinning mass 102 typically surrounds a portion of the shaft 103. A gap between the shaft 103 and the rotor attach portion 112 allows the shaft to move relative the rotor attach portion 112 and thus the spinning mass 102. This is because the shaft 103 is coupled to the spinning mass 102 via the respective spring arm portions of each of the suspension structures 106, 120, 122 and 124.

Figure 1B:
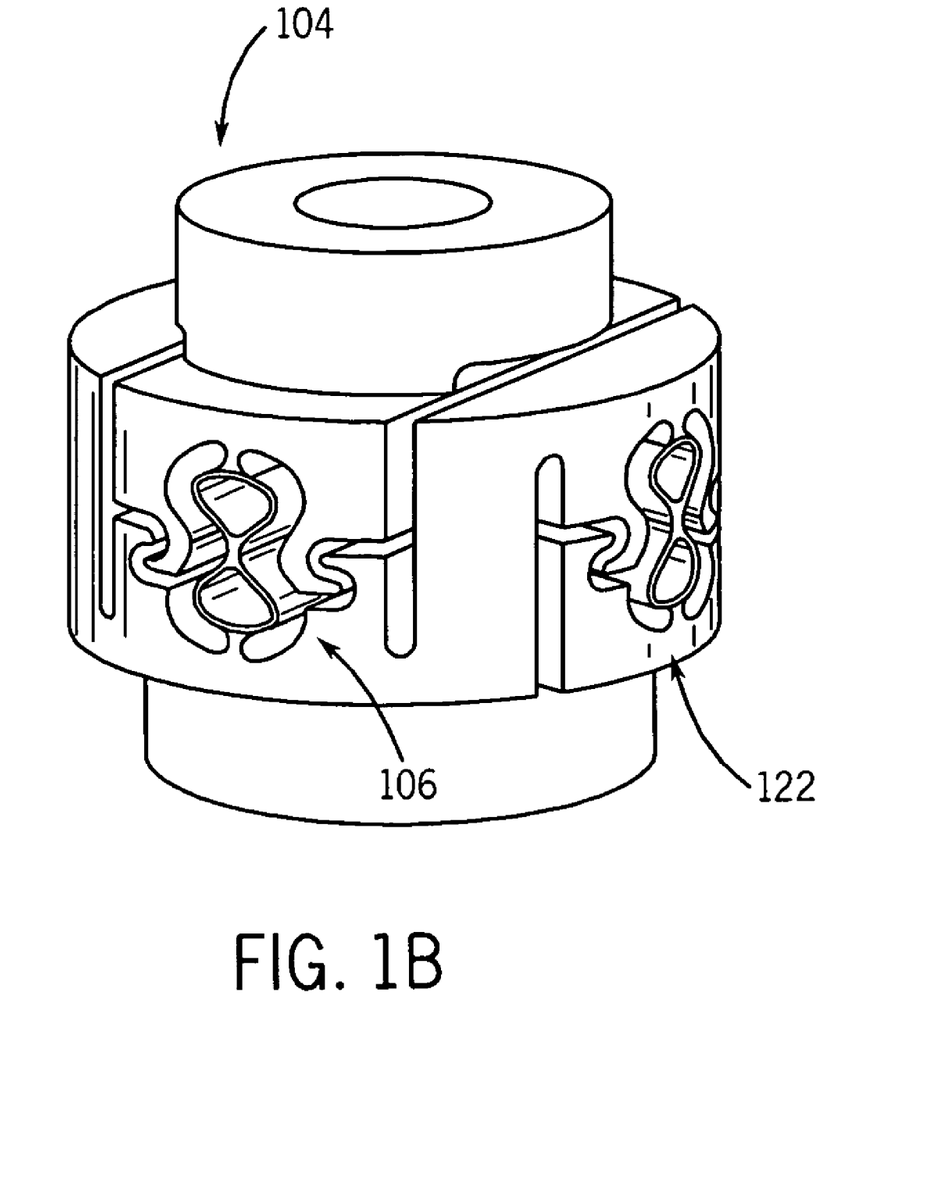
FIG. 1B shows a perspective side view of the FIG. 1A embodiment of the suspension component.

FIG. 1B shows a perspective side view of the FIG. 1A embodiment of the suspension component 104 showing the suspension structures 106 and 122.

Figure 1C:
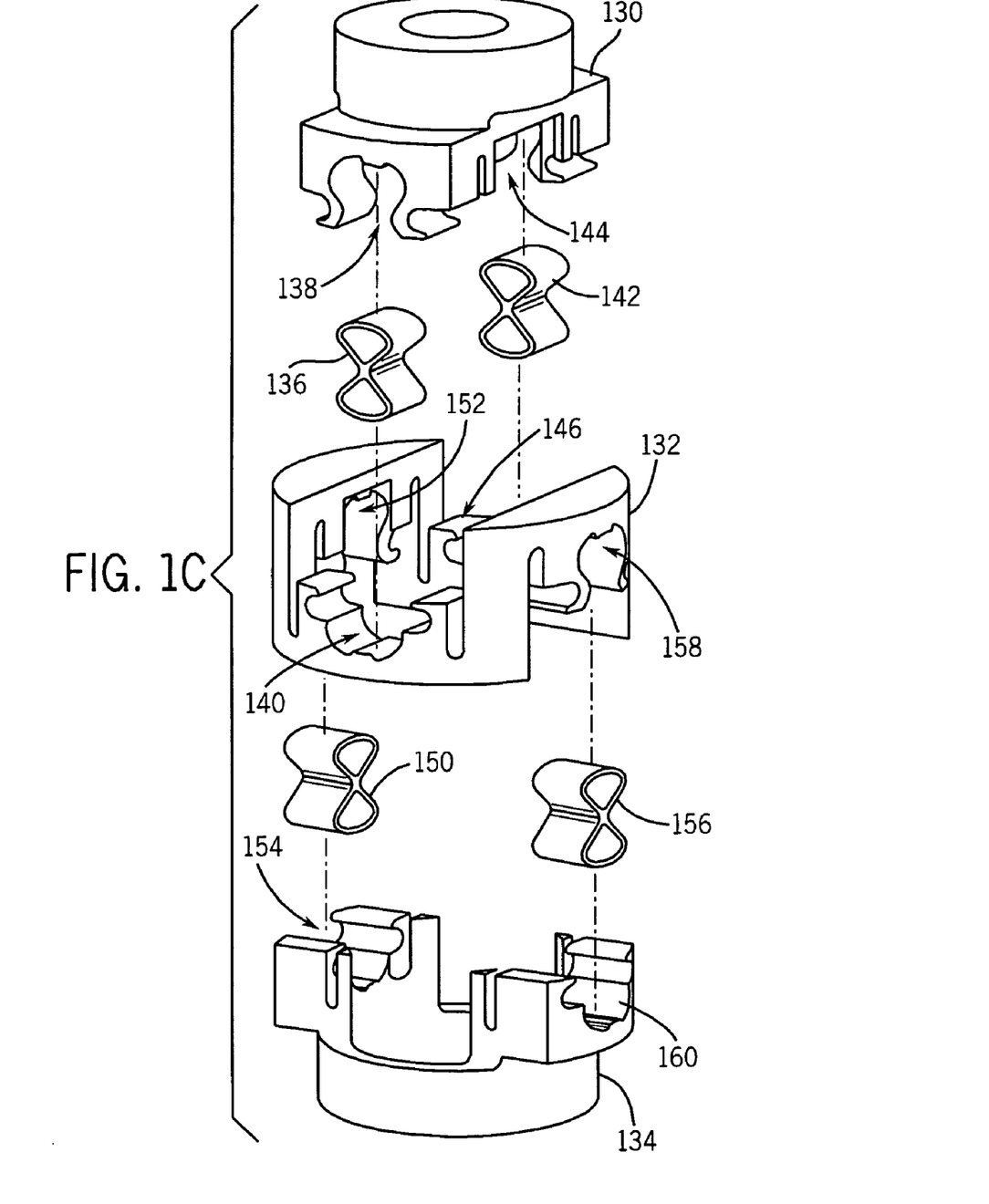
FIG. 1C shows a perspective exploded view of the FIG. 1A embodiment of the suspension component.

FIG. 1C shows a perspective exploded view of the FIG. 1 embodiment in which the suspension component 104 has a shaft attach portion 130, a gimbal 132 and a rotor attach portion 134. Note that the shaft attach portion 130 in FIG. 1C corresponds to the shaft attach portion 114 in FIG. 1A, and the rotor attach portion 134 in FIG. 1C corresponds to the rotor attach portion 112 in FIG. 1A. Preferably, the suspension component 104 may be a one piece construction of titanium, spring steel, silicon, or other suitable material. The exploded view depicted in FIG. 1C is provided for ease of describing the embodiment. Typically, this embodiment is formed as a single piece.

More specifically, a spring arm portion 136 is attached in first upper area 138 in the shaft attach portion 130 and first middle area 140 in the gimbal 132. A spring arm portion 142 is attached in second upper area 144 in the shaft attach portion 130 and second middle area 146 in the gimbal 132. A spring arm portion 150 is attached in third middle area 144 in the gimbal 132 and first lower area 154 in the rotor attach portion 134. A spring arm portion 156 is attached in fourth middle area 158 in the gimbal 132 and second lower area 160 in the rotor attach portion 134. Attachment of a respective spring arm portion in the suspension component is clearly shown in FIG. 1B.

Thus, in this embodiment the rotor 102, when linear forces are applied to the assembly, moves or rocks relative to the shaft 103 which passes through the rotor 102 and the rotor attach portion 112. Furthermore, the shaft 103 itself may also be used as a stop, in addition to the stops 108, 109. The gap for this stop is defined by the distance, which may be for example about 0.003 inch, between the shaft 103 and the inside surface of the rotor attach portion 112.

Figure 2A:
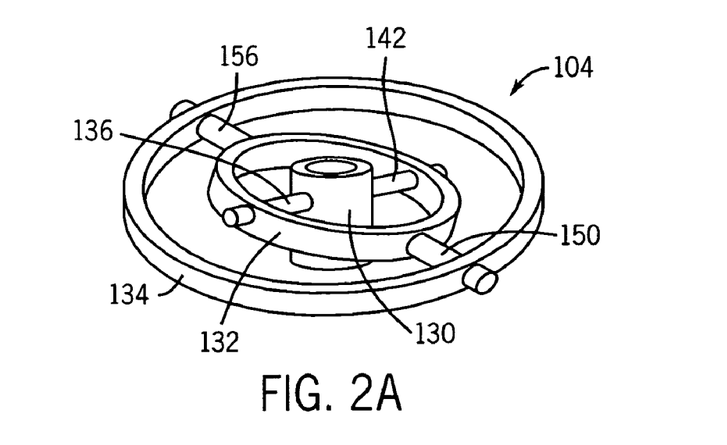
FIGS. 2A, 2B, and 2C show schematic functional views of the FIG. 1A embodiment.
Figure 2B:
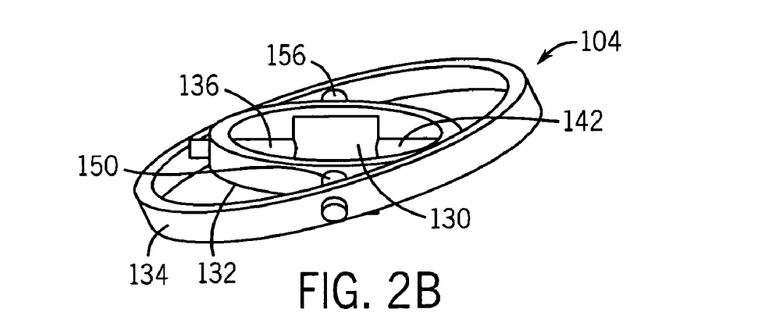
Figure 2C:
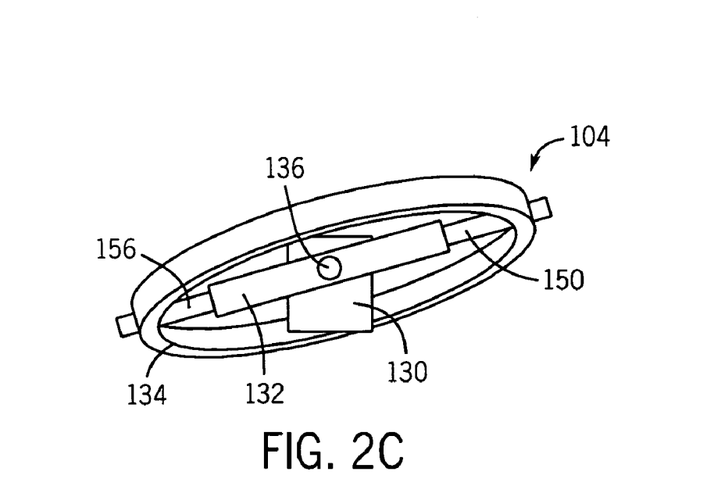

FIGS. 2A, 2B, and 2C show schematic functional views of the FIG. 1A embodiment of suspension structures of the suspension component 104 for a gyroscope according to the present method and apparatus. The suspension component may have a plurality of suspension structures 136, 142, 150 and 156 that are substantially evenly spaced around the suspension component 104. The suspension component 104 may also have a gimbal 132. In this embodiment the shaft attach portion 130 may be coupled to the gimbal 132 by the suspension structures 136 and 142. The rotor attach portion 134 may be coupled to the gimbal 132 by the suspension structures 150 and 156. The shaft attach portion 130 and the rotor attach portion 134 may thus be operatively coupled only via the substantially figure eight configured spring arm portion of each of the suspension structures 136, 142, 150 and 156.

In FIGS. 2A, 2B and 2C the flexible rods represent spring arm portions. The rods may have a low spring constant angularly. The rods may also have a high spring constant that is perpendicular and parallel to the rods. This results in linear spring rates that are larger than the angular spring rates.

In this embodiment the stops allow a maximum of 0.003 inch of axial and transverse travel. Limiting travel prevents overstressing the hinge, for example, the substantially figure eight configured spring arm portions. This limitation of travel is effective for linear forces applied from any direction.

In an embodiment each of the figure eight configured spring arm portion may have a wall thickness of approximately 0.002 inch. In this embodiment the suspension component (the substantially figure eight configured spring arm portion) may be formed from 6AL-4V Titanium by EDM (Electrode Discharge Machining). Other spring-type materials may be used, such as spring steel. As noted above, the entire suspension component may be a unitary one piece construction.

Figure 3:
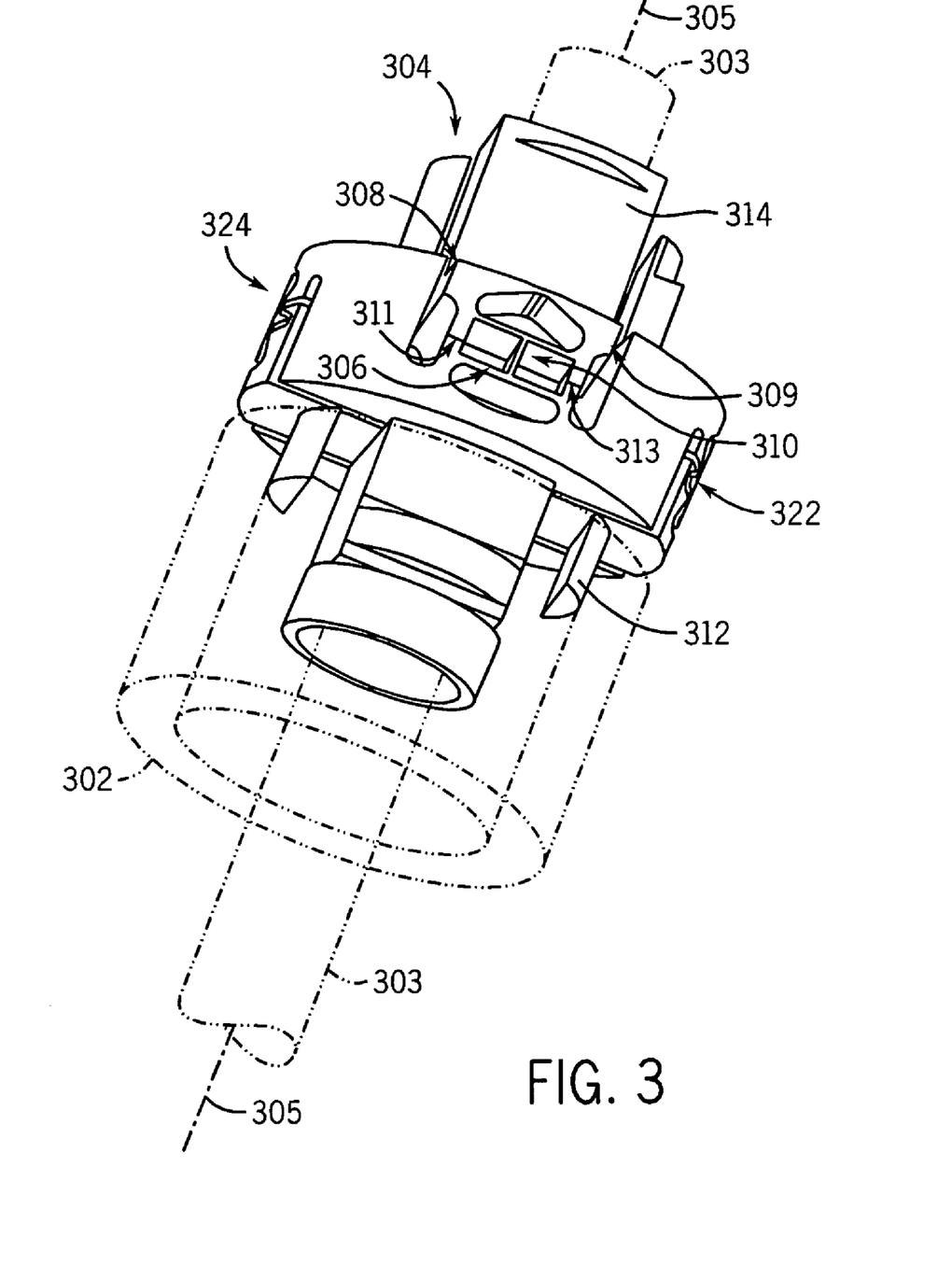
FIG. 3 shows a perspective side view of another embodiment of a suspension component for a gyroscope according to the present method and apparatus.

FIG. 3 shows a perspective side view of another embodiment of a suspension component for a gyroscope according to the present method and apparatus. In this embodiment the suspension component 304 may couple a rotating shaft 303 to a spinning mass 302, such as a rotor, to form a two degree of freedom rate gyroscope. The spinning mass 302 may be attached to a rotor attach portion 312 of the suspension component 304, and the shaft 303 may be coupled to a shaft attach portion 314 of the suspension component 304. The spinning mass 302 may have a longitudinal spin axis 305, and the shaft 303 for rotating the spinning mass 302 may be aligned to the longitudinal spin axis 305. The suspension component 304 may have at least two pairs of suspension structures 306, 320 and 322, 324 that are orthogonal to each other. Each of the suspension structures 306, 320 (not shown in FIG. 3), 322 and 324 may have at least first and second pairs of opposed mechanical stops 308, 309 and 311, 313, the pairs of opposed mechanical stops, in one embodiment, may be oriented at substantially 90 degrees relative to one another. The first and second pairs of opposed mechanical stops limit movement of the shaft 303 and spinning mass 302 relative to one another due to linear forces on the gyroscope while allowing movement of the shaft 303 and spinning mass 302 relative to one another due to angular forces on the gyroscope. In the depicted embodiment the suspension structure 306 may also have a substantially I-shaped spring arm portion 310.

In an embodiment the first and second pairs of opposed mechanical stops 308, 309 and 311, 313 limit movement of the shaft 303 and spinning mass 302 relative to one another to approximately 0.003 inches. Each of the first and second pairs of opposed mechanical stops 308, 309 and 311, 313 may have a gap of approximately 0.003 inch. More generally, the gap may be in the range of 0.002 to 0.005 inch.

In this embodiment the stops allow a maximum of 0.003 inch of axial and transverse travel. Limiting travel prevents overstressing the hinge (I-shaped spring arm portion). Coupled with other similarly designed stops, this limitation of travel is effective for linear forces applied from any direction.

In this embodiment the substantially I-shaped spring arm portion may have a wall thickness of approximately 0.002 inch, for example. Also, in this embodiment the suspension component with the substantially I-shaped spring arm portion may be formed from 6AL-4V Titanium by EDM (Electrode Discharge Machining). Other spring-type materials may be used, such as spring steel. Also, configurations other than the I-shaped may be utilized.

In each of the FIG. 1A and FIG. 3 embodiments the suspension structures act as flexures that can flex in both the x and y directions. The flexures are strong in a linear sense, but are weak in an angular sense.

Figure 4:
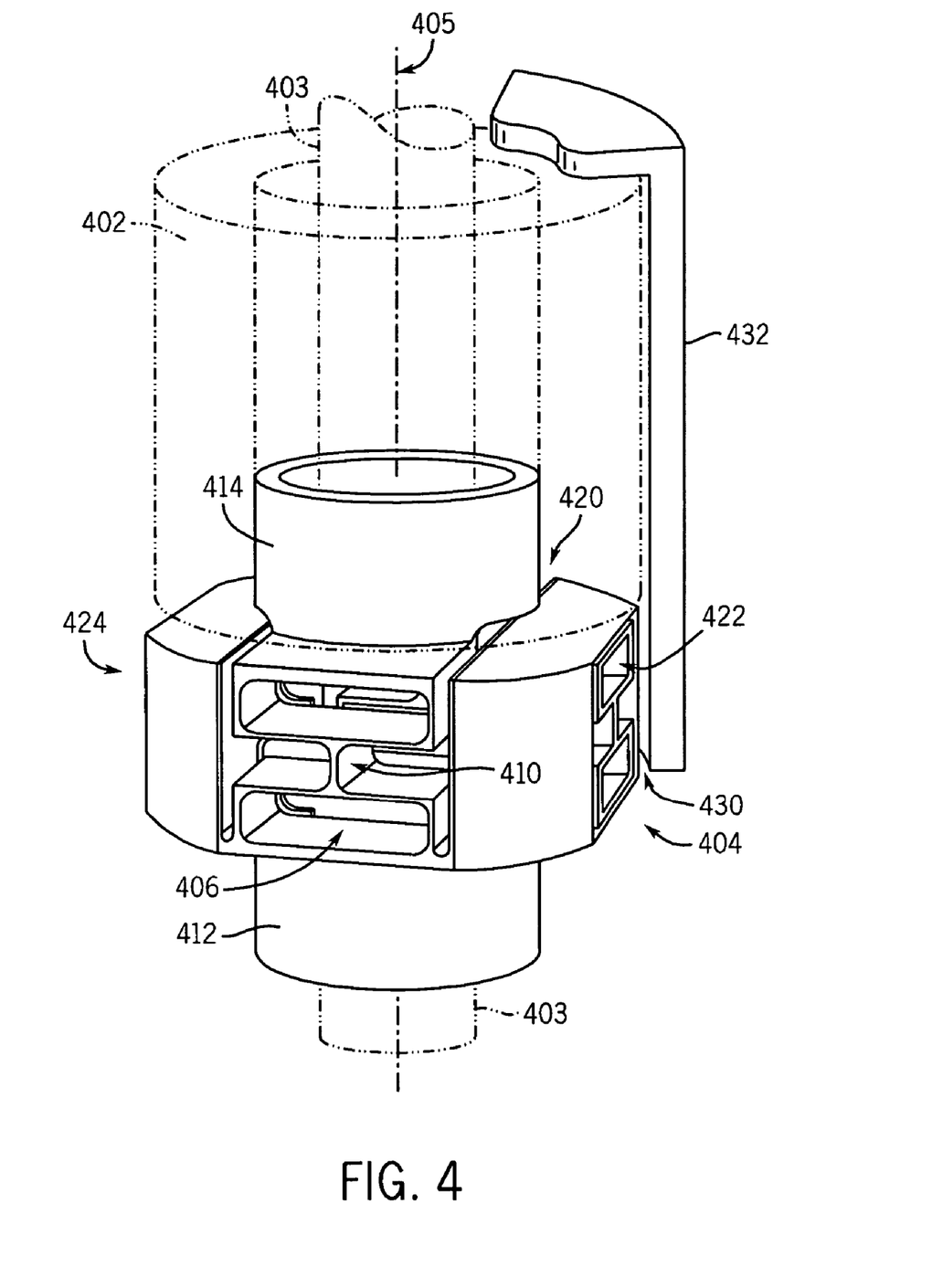
FIG. 4 shows a perspective side view of a further embodiment of a suspension component for a gyroscope according to the present method and apparatus.

FIG. 4 shows a perspective side view of another embodiment of a suspension component for a two degree of freedom gyroscope according to the present method and apparatus. In this embodiment the suspension component 404 has suspension structures 406, 420, 422, 424 that couple a rotating shaft 403 to a spinning mass 402, such as a rotor, to form the two degree of freedom gyroscope. The spinning mass 402 may be attached to a rotor attach portion 414 of the suspension component 404, and the shaft 403 may be coupled to a shaft attach portion 412 of the suspension component 404. The spinning mass 402 may have a longitudinal spin axis 405, and the shaft 403 for rotating the spinning mass 402 may be aligned to the longitudinal spin axis 405. The suspension component 404 may have at least first and second pairs of suspension structures 406, 420, 422, 424. The two pairs of suspension structures 406, 420 and 422, 424 are orthogonal to each other. Each of the suspension structures 406, 420, 422 and 424 may have a substantially I-shaped spring arm portion 410 as described above. A mechanical stop may also be formed by a gap 430 between the rotor 402, and/or the suspension component 404 and a housing 432.

In the embodiments depicted herein there are six different motions that are to be protected, that are three angular and three linear in, for example, an x, y, z coordinate system. For example, in the FIG. 4 embodiment the shaft axis 405 may be considered a z-axis, and the stops are then in the x-axis and y-axis plane. As described above, the rotor 402 is rotating and is able to flex due to the suspension structures 406, 420, 422 and 424. If a force pushes against the rotor 402 or if the shaft 403 is subjected to an acceleration, the rotor 402 will move in the x, y plane and may stop or bottom out on the shaft, in addition to the other described stops.

When the gyroscope is subjected to a linear or angular shock or high g acceleration, the rotor is forced against the suspension elements according to Newton's second law. The suspension flexures act as both angular and linear springs. Therefore, the suspension flexures bend until the suspension elements "bottom out" on the mechanical stops. The stops are designed in such a way that they are present in all 3 angular axes and all 3 translational axes.

Figure 5A:
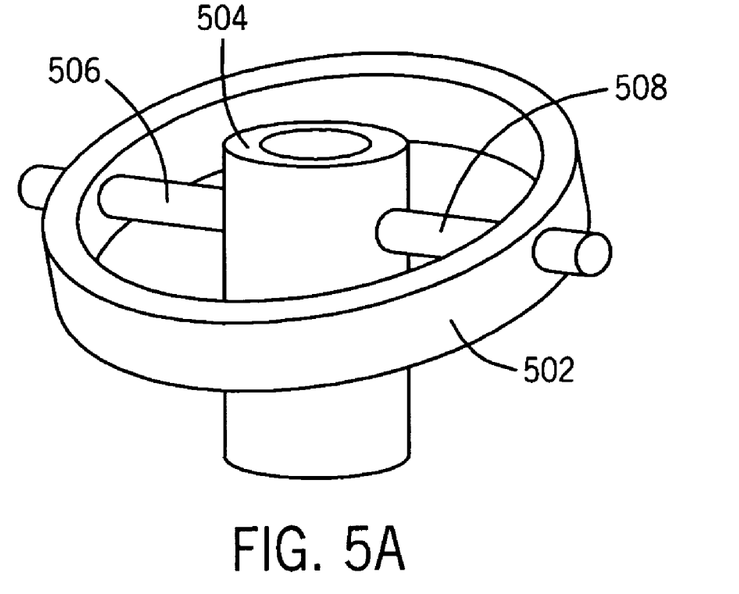
FIGS. 5A and 5B show functional views of an alternative embodiment of suspension structures for a one degree of freedom gyroscope according to the present method and apparatus.
Figure 5B:
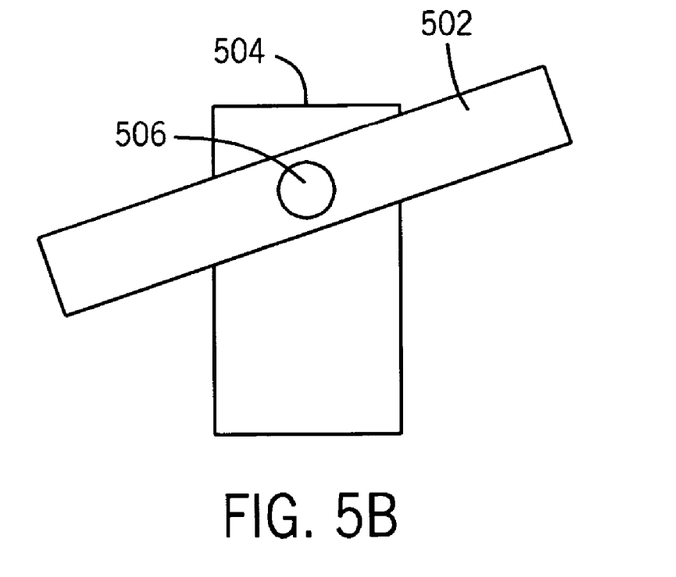

FIGS. 5A and 5B depicts an alternative embodiment in which a spinning mass, which may be coupled to a rotor attach portion 502, may annularly flex only about one linear axis. This linear axis may be, for example, the axis of the shaft attach portion 504. The rotor attach portion may be coupled to the shaft attach portion 504 by suspension structures 506 and 508. Thus, the rotor attach portion 502 is rotatable about an axis of the shaft attach portion 504, but is stiff in the other angular directions. Here, two different angular inputs may be measured because the spinning mass that is attached to the rotor attach portion will oscillate in response to these two different angular inputs. When the spinning mass oscillates, then the depth of oscillation, and the phase of the oscillation, when compared to a case of the gyroscope, is a function of rate input. In general the depicted outer ring or rotor 502 may bottom out onto the shaft 504, a housing, and/or suspension elements and still retain required spring rates without yielding the spring structures.

The suspension component according to the present method and apparatus overcomes the drawbacks of prior art. The suspension component maintains gyro performance levels of standard designs by maintaining required angular spring rates while utilizing a structure that exhibits higher spring rates along the linear axes that will flex but not buckle under increased dynamic loading. The improved design utilizes standard processes for flexure machining, flexible shock protection beams, and integral mechanical stops. These features add little cost in manufacture while providing the needed shock protection.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. An apparatus, comprising:
 a first component coupled to a second component by a suspension component;
 the suspension component having at least first and second pairs of suspension structures; and
 each suspension structure of the at least first and second pairs of suspension structures having at least a spring arm portion; and
 at least one mechanical stop;
 wherein the apparatus further comprises a rotor coupled to the second component, and wherein the apparatus further comprises a housing surrounding at least the rotor, and wherein the at least one mechanical stop is formed by a gap between a portion of the rotor and a portion of the housing.

2. The apparatus according to claim 1, wherein the apparatus further comprises a housing surrounding at least the suspension component, and wherein the at least one mechanical stop is formed by a gap between a portion of the suspension component and a portion of the housing.

3. The apparatus according to claim 1, wherein each suspension structure of the at least first and second pairs of suspension structures has at least first and second mirror image opposed meandering mechanical stops.

4. The apparatus according to claim 3, wherein the first and second mirror image opposed meandering mechanical stops limit movement of the first and second components relative to one another due to linear forces on the apparatus while allowing movement of the first and second components relative to one another due to angular forces on the apparatus.

5. The apparatus according to claim 4, wherein the first and second mirror image opposed meandering mechanical stops limit movement of the first and second components relative to one another to approximately 0.003 inches.

6. The apparatus according to claim 3, wherein the spring arm portion has a substantially figure eight configuration, and wherein the first and second components are operatively coupled only via the spring arm portion.

7. The apparatus according to claim 1, wherein the first and second pairs of suspension structures are substantially evenly spaced around the suspension component.

8. The apparatus according to claim 1, wherein suspension component is a gimbal, and wherein the first pair of suspension structures are operatively coupled between the gimbal and the first component, and wherein the second pair of suspension structures are operatively coupled between the gimbal and the second component.

9. The apparatus according to claim 1, wherein each suspension structure of the at least first and second pairs of suspension structures has at least first and second pairs of opposed mechanical stops, the pairs of opposed mechanical stops oriented at substantially 90 degrees relative to one another.

10. The apparatus according to claim 9, wherein the first and second pairs of opposed mechanical stops limit movement of the first and second components relative to one another due to linear forces on the apparatus while allowing movement of the first and second components relative to one another due to angular forces on the apparatus.

11. The apparatus according to claim 10, wherein the first and second pairs of opposed mechanical stops limit movement of the first and second components relative to one another to approximately 0.003 inches.

12. The apparatus according to claim 9, wherein the spring arm portion has a substantially I-shaped configuration, and wherein the first and second components are operatively coupled only via the spring arm portion.

13. The apparatus according to claim 1, wherein the suspension component is a one-piece component of 6AL-4V Titanium.

14. The apparatus according to claim 1, wherein the at least one mechanical stop is integral with the suspension component.

15. The apparatus according to claim 1, wherein the apparatus further comprises a shaft coupled to the first component, the shaft extending through the second component and the suspension component, and wherein the at least one mechanical stop is formed by a gap between a portion of the shaft and a portion of the second component.

16. The apparatus according to claim 1, wherein the apparatus is a two degree of freedom gyroscope.

17. The apparatus according to claim 1, wherein the apparatus is a one degree of freedom gyroscope.

18. A two degree of freedom rate gyroscope comprising:
a spinning mass having a longitudinal spin axis;
a shaft for rotating the spinning mass, the shaft aligned to the longitudinal spin axis;
a suspension component that operatively couples the shaft to the spinning mass;
the suspension component having at least first and second pairs of suspension structures; and
each suspension structure of the at least first and second pairs of suspension structures having mechanical stops, and having a spring arm portion;
wherein the suspension component has at least first and second mirror image opposed mechanical stops; and
wherein the first and second mirror image opposed mechanical stops limit movement of the shaft and spinning mass relative to one another due to linear forces on the gyroscope while allowing movement of the shaft and spinning mass relative to one another due to angular forces on the gyroscope.

19. The two degree of freedom rate gyroscope according to claim 18, wherein the suspension component is a one-piece component of 6AL-4V Titanium.

20. A two degree of freedom rate gyroscope comprising:
a spinning mass having a longitudinal spin axis;
a shaft for rotating the spinning mass, the shaft aligned to the longitudinal spin axis;
a suspension component that operatively couples the shaft to the spinning mass;
the suspension component having at least first and second pairs of suspension structures; and
each suspension structure of the at least first and second pairs of suspension structures having mechanical stops, and having a spring arm portion;
wherein the shaft is coupled to a first end of the suspension component, and wherein the spinning mass surrounds a portion of the shaft and is coupled to a second end of the suspension component and wherein the portion of the shaft is space apart from the second end of the suspension component to thereby form a further stop for the suspension component.

21. The two degree of freedom rate gyroscope according to claim 20, wherein the suspension component is a one-piece component of 6AL-4V Titanium.

* * * * *